G. HORNIACHEK.
ELEVATED TRACTION DEVICE FOR AUTOMOBILES.
APPLICATION FILED MAR. 3, 1916.
1,251,033.
Patented Dec. 25, 1917.
2 SHEETS—SHEET 1.
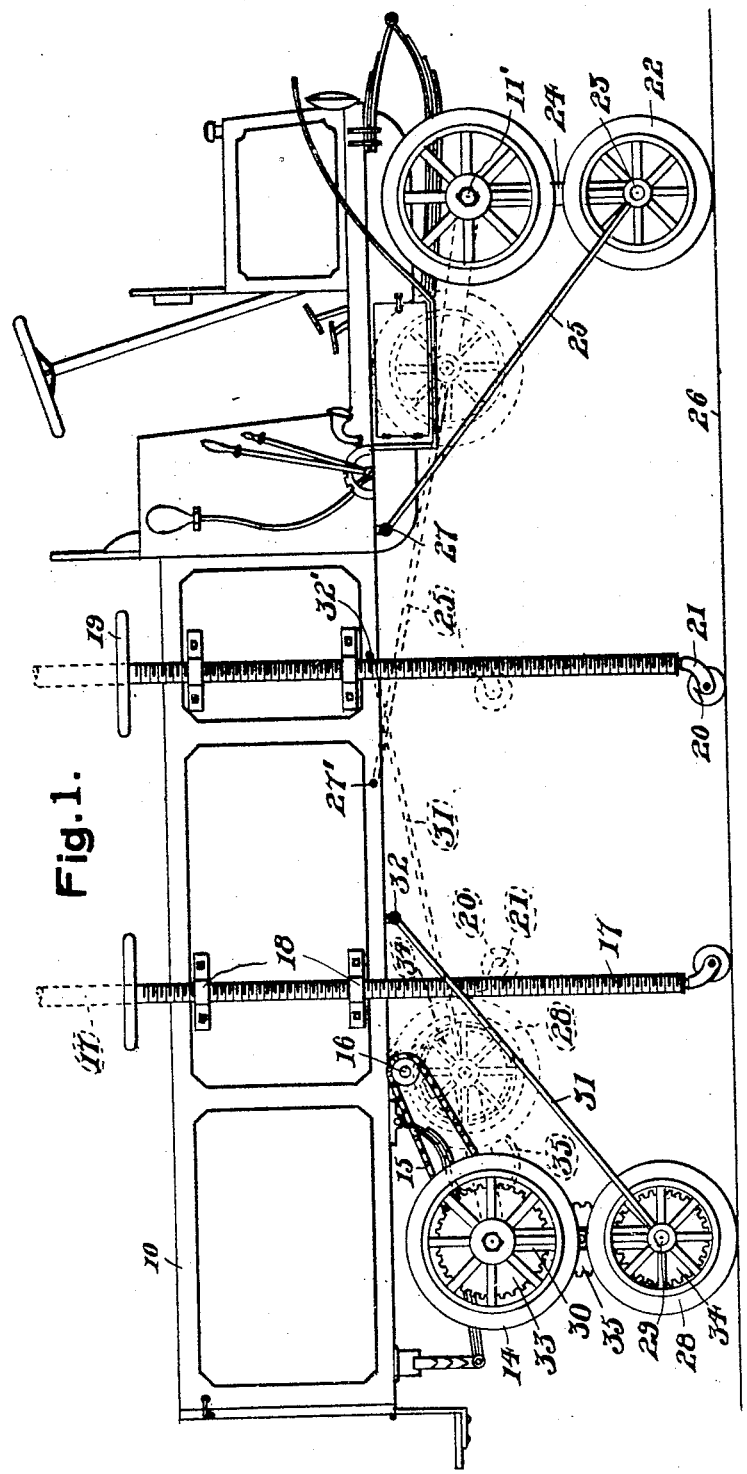
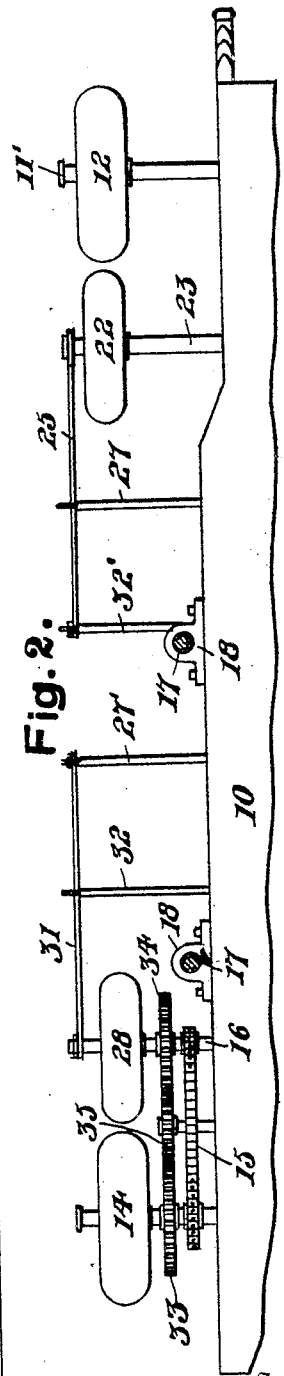
Inventor
G. Horniachek
By A. M. Wilson
Attorney G. HORNIACHEK.
ELEVATED TRACTION DEVICE FOR AUTOMOBILES.
APPLICATION FILED MAR. 3, 1916.
1,251,033.
Patented Dec. 25, 1917.
2 SHEETS—SHEET 2.
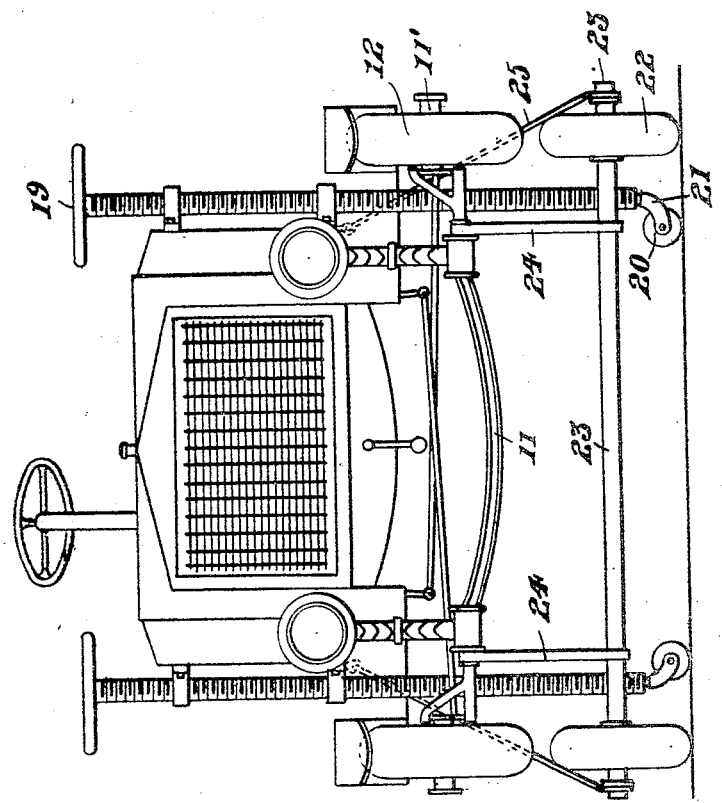
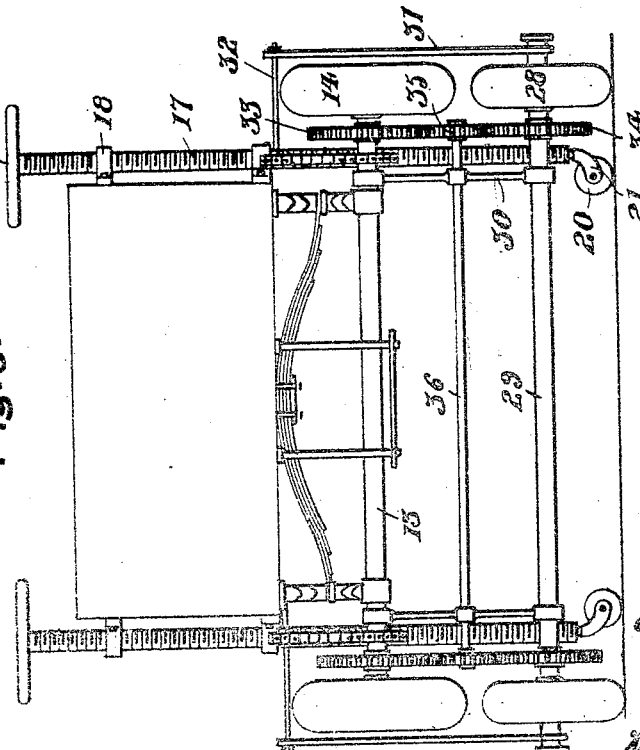
Inventor
G. Horniachek
By A. M. Wilson
Attorney

UNITED STATES PATENT OFFICE.

GEORGE HORNIACHEK, OF ROULEAU, SASKATCHEWAN, CANADA.

ELEVATED TRACTION DEVICE FOR AUTOMOBILES.

1,251,033.  Specification of Letters Patent.  Patented Dec. 25, 1917.

Application filed March 3, 1916. Serial No. 81,995.

*To all whom it may concern:*

Be it known that I, GEORGE HORNIACHEK, a subject of the Emperor of Austria, residing at Rouleau, in the Province of Saskatchewan and Dominion of Canada, have invented certain new and useful Improvements in Elevated Traction Devices for Automobiles, of which the following is a specification.

This invention relates to certain new and useful improvements in elevated traction devices for automobiles.

The primary object of this invention is the provision of readily operated means upon an automobile whereby the same may be released and dislodged when stuck in the mud or upon similar occasions, the device being simple in construction and strong, durable and efficient in its operation.

A further object of the device is the provision of a dislodging and auxiliary propelling means for an automobile and whereby the automobile may be readily elevated above the roadbed when found desirable and made to travel upon a set of auxiliary running wheels, it being known that automobiles and similar vehicles often become stuck in the mud upon country and other roads which requires considerable delay and annoyance to the operators thereof and the present provision is made whereby the operator of a vehicle may readily force a plurality of jackscrews downwardly for bodily elevating the automobile, while auxiliary or extension wheels may be then positioned under the forward and rear axles of the vehicles for supporting the latter, the rear auxiliary wheels being geared for operation by the motor of the vehicle.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like designating characters refer to corresponding parts throughout the several views:—

Figure 1 is a side elevation of an automobile provided with the present device, the automobile being in its elevated position in normal arrangement of jack screws and auxiliary wheels being illustrated therein by dotted lines.

Fig. 2 is an inverted plan view of a side portion of the device in its normal position.

Fig. 3 is a rear elevation, and

Fig. 4 is a front elevation thereof.

The present device being arranged for elevating a vehicle and propelling the vehicle while in its elevated position, the same is herein illustrated in connection with a motor truck 10 of substantially the usual construction and having the forward axle 11 provided with spindles 11' having steering wheels 12, while the rear axle 13 of the truck is provided with traction or propelling wheels 14 operatively connected by opposite sprocket driving chains 15 with a driven shaft 16 that is suitably connected to the motor (not shown) with which the truck is provided.

Four jack-screws 17 are provided for the truck, the same being arranged in pairs upon the opposite sides thereof, the said screws being attached to the automobile 10 by means of vertically alining brackets 18 through which the said screws are threaded, each screw being provided with a turn wheel 19 at the top thereof by means of which the screws may be lowered or elevated as found desirable. Relatively wide rollers 20 are swiveled upon the lower ends of the screws 17 by means of feet 21 in which the said rollers are journaled.

Auxiliary forward wheels 22 are provided for supporting the automobile when elevated, the said wheels being journaled upon the opposite ends of an auxiliary forward axle 23 which is connected to the opposite ends of the front axle 11 by means of links 24, thus mounting the auxiliary wheels 22 movable partially around the wheels 12 in the same planes therewith. Brace rods 25 are attached adjacent the outer ends of the said shaft 23 for assisting in swinging the auxiliary wheels 22 from their normally elevated position as shown by dotted lines in Fig. 1 to their emergency ground-engaging positions as fully illustrated in said figure at which time the said auxiliary front wheels 22 engage the roadbed 26 and the free ends of the rods 25 are attached to laterally projecting posts 27 at the sides of the automobile 10. When the forward auxiliary wheels 22 are in their normal inoperative or elevated positions, the rods 25 have their free ends engaging with similar oppositely arranged posts 27'. By this arrangement, it will be seen that when the automobile 10 is elevated off of the regular ground wheels 12 and 14 by means of the jack screws 17, the rods 25 may be released from the posts 27' and the wheels 22 swung downwardly into engagement with the roadbed and the free ends of the rods 23 then attached to the forward posts 27.

Rear auxiliary wheels 28 are mounted upon the rear axle 13 of the automobile in substantially a similar manner being provided with an auxiliary rear axle 29 which is shiftably connected to the axle 14 by means of opposite side links 30 whereby the auxiliary wheels 28 are normally arranged elevated as shown by dotted lines in Fig. 1, but may be readily swung into engagement with the roadbed 26 by means of opposite rods 31 journaled to the opposite ends of the auxiliary rear shaft 29 and having their free ends removably mounted upon laterally projecting posts 32 carried by the automobile 10, it being understood that the said rods 31 have their free ends attached to similar laterally projecting posts 32' when the auxiliary rear wheels are in their elevated positions.

The rear axle 13 and traction wheels 14 being propelled by the motor of the automobile 10, power is transmitted to the auxiliary rear wheels 28 by means of opposite gears 33 carried adjacent the opposite ends of the axle 13 and operatively connected to similar gears 34 carried by the auxiliary rear axle 29 by means of idler gears 35 interposed between the gears 33 and 34 mounted upon a transverse shaft 36 journaled through the links 30 midway between and parallel with the said axles 13 and 29.

From this detailed description of the invention the complete operation thereof will be apparent, it being understood that when the automobile 10 is desired to be elevated with its ground wheels 12 and 14 above the roadway or foundation 26 for any reason such as the fact that the said wheels were embedded in mud, the jack screws 17 will be operated by the hand wheels 19 for forcing the rollers 20 onto a firm foundation at the bottom of the mud or upon firm members such as blocks or boards (not shown) flatly positioned upon the roadbed for the reception of the rollers 20, the automobile 10 being readily so elevated supported solely by the jack screws 17. The forward auxiliary wheels 22 will then be swung downwardly as will also the rear traction wheels 28 by means of their respective rods 25 and 31. The auxiliary wheels 28 will be operated simultaneously with the rear wheels 14 during the running of the automobile motor and such wheels 28 will now become the propelling means for the automobile 10 in its elevated position, it being understood that boards may also be employed for supporting the wheels 22 and 28 if required, while the jack screws 17 may be retracted by being reversely turned through the agency of the wheels 19 whenever the vehicle is ready for movement in its elevated position upon the auxiliary wheels 22 and 28.

While the form of the invention herein shown and described is what is believed to be the preferred embodiment thereof, it is nevertheless to be understood that minor changes may be made therein without departing from the spirit and scope of the invention as claimed. It will be noted that the auxiliary wheels 22 and 28 are of slightly less diameter than the main wheels 12 and 14, the auxiliary wheels being positioned above the roadbed when normally elevated, the rear auxiliary wheels 28 being in operation at all times with the rear wheels 14.

What I claim as new is:—

1. A device of the class described comprising an automobile having forward and rear axles, auxiliary forward wheels swingingly connected to the said forward axle normally out of engagement with the roadbed, shifting rods for the said auxiliary forward wheels, an auxiliary rear axle, auxiliary traction wheels upon the said auxiliary rear axle, operative connections between the said rear axle and rear auxiliary axle, shifting rods for the said auxiliary rear axle, and elevating means for the automobile.

2. A device of the class described comprising an automobile having forward and rear axles, auxiliary forward wheels swingingly connected to the said forward axle normally out of engagement with the roadbed, shifting rods for the said auxiliary forward wheels, an auxiliary rear axle, auxiliary traction wheels upon the said auxiliary rear axle, operative connections between the said rear axle and rear auxiliary axle, shifting rods for the said auxiliary rear axle, blocks carried by the opposite sides of the automobile, jack screws threaded through the said blocks and vertically arranged at points intermediate the said front and rear wheels, rollers swivelly mounted upon the lower ends of the said screws, and operating wheels carried by the tops of the latter.

In testimony whereof I affix my signature.

GEORGE HORNIACHEK.